(12) United States Patent
Pannewtiz et al.

(10) Patent No.: US 9,138,954 B2
(45) Date of Patent: Sep. 22, 2015

(54) PRESS FOR PRODUCING PELLETS FROM POWDERED MATERIAL

(71) Applicant: Fette Compacting GmbH, Schwarzenbek (DE)

(72) Inventors: Thomas Pannewtiz, Klein Pampau (DE); Holger Behns, Reinbek (DE)

(73) Assignee: Fette Compacting GmbH, Schwarzenbek (DE)

( * ) Notice: Subject to any disclaimer, the term of this patent is extended or adjusted under 35 U.S.C. 154(b) by 0 days.

(21) Appl. No.: 14/466,545

(22) Filed: Aug. 22, 2014

(65) Prior Publication Data

US 2015/0056315 A1     Feb. 26, 2015

(30) Foreign Application Priority Data

Aug. 23, 2013  (DE) .......................... 10 2013 109 157

(51) Int. Cl.
| | |
|---|---|
| *B29C 43/04* | (2006.01) |
| *B30B 1/00* | (2006.01) |
| *B30B 11/00* | (2006.01) |
| *B30B 11/02* | (2006.01) |
| *B22F 3/02* | (2006.01) |
| *C04B 41/80* | (2006.01) |

(52) U.S. Cl.
CPC . *B30B 1/007* (2013.01); *B22F 3/02* (2013.01); *B30B 11/005* (2013.01); *B30B 11/007* (2013.01); *B30B 11/02* (2013.01); *C04B 41/80* (2013.01)

(58) Field of Classification Search
CPC ...... B30B 1/007; B30B 11/02; B30B 11/005; B30B 11/007; B22F 3/02
USPC ............................ 425/78, 344–345, 350–355
See application file for complete search history.

(56) References Cited

U.S. PATENT DOCUMENTS

| | | | | |
|---|---|---|---|---|
| 4,890,998 | A | * | 1/1990 | Grabener et al. .............. 425/193 |
| 7,191,593 | B1 | * | 3/2007 | Ho ................................... 60/403 |
| 8,523,550 | B2 | | 9/2013 | Wehrli et al. |
| 2008/0020082 | A1 | | 1/2008 | Plucinski et al. |
| 2008/0141668 | A1 | | 6/2008 | Micklisch |

FOREIGN PATENT DOCUMENTS

| | | |
|---|---|---|
| DE | 20 2009 011 301 U1 | 12/2009 |
| DE | 10 2010 048 183 A1 | 4/2012 |
| DE | 10 2011 116 552 A1 | 4/2013 |
| EP | 2 098 317 A1 | 9/2009 |
| JP | 20100234379 A | 10/2010 |

* cited by examiner

*Primary Examiner* — Joseph S Del Sole
*Assistant Examiner* — Thukhanh T Nguyen
(74) *Attorney, Agent, or Firm* — Vidas, Arrett & Steinkraus

(57) ABSTRACT

The invention relates to a press for producing pellets from powdered material comprising at least one die with a mold cavity imaging the pellet, at least one upper punch and at least one lower punch that interact with the mold cavity to form the pellet, and at least one electric drive for driving the upper punch, and/or the lower punch, and/or the die along a main press axis, wherein the press also comprises at least one movable element acting on the die and/or the mold cavity of the die, wherein at least one electro-hydrostatic drive is provided to drive the at least one movable element.

7 Claims, 3 Drawing Sheets

PRESS FOR PRODUCING PELLETS FROM POWDERED MATERIAL

FIELD OF THE INVENTION

The invention relates to a press for producing pellets from powdered material comprising at least one die with a mould cavity replicating the pellet, at least one upper punch and at least one lower punch that interact with the mould cavity to form the pellet, and at least one electric drive for driving the upper punch, and/or the lower punch, and/or the die along a main press axis.

BACKGROUND OF THE INVENTION

A press for producing pellets from powdered material is for example known from DE 10 2006 020 213 B4, the entire contents of which is hereby incorporated by reference. The die is rotatably mounted on a die table, and an adjusting cylinder is arranged on the die table, the cylinder being in a rotary drive connection with the die by means of a mechanical deflection. With the known press, for example twisted, angled-tooth, or other parts can be produced. Both the main drives for the press punch as well as the drive for rotating the die are hydraulic drives.

Furthermore, a press for producing a briquette from powdered material is known from DE 10 2010 048 183 A1, the entire contents of which is hereby incorporated by reference, in which several drives act via a mechanical deflection of 90° on transverse punches which interact with the mould cavity of the die along a transverse axis running transverse to the main press axis. The drives for driving the transverse punch can be both electric drives as well as hydraulic drives. Such a mechanical deflection of a drive acting on a transverse punch is also known from EP 2 103 423 A1, the entire contents of which is hereby incorporated by reference. Pellets can be created with such transverse punches which have transverse bore holes or lateral recesses.

In particular with presses with electric drives for the press axes, there has been no satisfactory solution to date for providing high force in a small installation space. Electric drives require significant installation space. To address this problem, electric drives are frequently arranged at a distance from the die. The mechanical deflections frequently provided in the prior art lead to undesirable control imprecision, a complex design and increased wear. The hydraulic drives provided in the prior art alternatively to electric drives require significant hydraulic complexity, particularly in regard to the hydraulic aggregate, the valves, etc. and are more difficult to control than electric drives. Providing different drives such as electric drives for the main pressing axes and hydraulic drives for the transverse pressing axes leads to imprecision in regard to controlling and the safety design of the press.

Based on the described priority, the invention addresses the problem of simplifying the press design, reducing the installation space and improving the controlling of the other actuating elements or punches in addition to the upper and/or lower punches that are moved along the main press axis.

BRIEF SUMMARY OF THE INVENTION

The invention solves the problem for a press of the above-cited type in that the press also comprises at least one movable element acting on the die and/or the mould cavity of the die, wherein at least one electro-hydrostatic drive is provided to drive the at least one movable element.

With the press according to the invention, pellets consisting of metal powder can be produced for a subsequent sintering process, such as for the production of tools, etc. The press according to the invention can have a die plate with the die in a manner known per se.

The upper and/or lower punch can be arranged on upper or respectively lower punch plates. The press can possess a press frame in which the aforementioned elements of the press are arranged. The press possesses a suitable filling device by means of which the powdered material is added to the mould cavity in the die. By means of the electric drive(s), the upper and/or lower punch, and/or the die, or respectively a die plate which may have a die, are moved along the main press axis such that the powdered material added to the die is pressed in the mould cavity. Both the ejection process is possible in which the die is arranged stationary, and the upper and lower punch are moved, as well as the withdrawal process in which the lower punch is arranged stationary, and the upper punch as well as the die, or respectively a die plate that may have the die, are moved. The main press axis is for example arranged in a vertical direction.

The electric drive(s) for the main press axis can for example be electric spindle drives. An electric motor can rotatably drive for example an axially fixed spindle. A spindle nut running on the spindle is moved thereby in the axial direction of the spindles. The spindle nut generally acts by means of a force transmitting apparatus on the upper and/or lower punch plate and moves therewith the upper punch and/or lower punch in the direction of the main press axis which runs at a parallel distance or coaxial to the longitudinal axis of the at least one spindle. The upper punch as well as the lower punch can be moved thereby, or only one of the upper punch and lower punch. For example, two upper and/or two lower of such electric drives can be provided that each act together for example on an upper punch plate and/or lower punch plate. The force transmitting apparatus can for example be a force transmitting bridge running in a horizontal direction, and the spindle nuts are mounted on its opposing ends such that they move the force transmitting bridge in a vertical direction.

According to the invention, at least one additional movable element is provided which acts on the die and/or the mould cavity of the die, and which is moved by at least one electro-hydrostatic drive. In particular, a plurality of such movable elements and correspondingly a plurality of such electro-hydrostatic drives can be provided. One electro-hydrostatic drive can be provided for each movable element. It is however also conceivable for one electro-hydrostatic drive to drive a plurality of movable elements. According to the invention, one or respectively a plurality of electro-hydrostatically driven additional axes is provided. Electro-hydrostatic drives are known in principle. Generally, they possess a hydraulic cylinder which is actuated by means of a hydraulic pump. The hydraulic pump in turn is driven by an electric motor. In terms of control engineering, electrostatic drives behave like purely electric drives.

For controlling, the electric motor of the electro-hydrostatic drive can therefore be actuated in the same manner as electric drives provided for the main press axis. A uniform approach in terms of control engineering can therefore be realized in the press. A uniform approach in terms of safety engineering can also be realized due to the use of uniform drive types. According to the invention, the advantages of hydraulic drives, particularly the compact design with a high exertion of force, and the advantages of electric drives, particularly the simple and precise controlling of electric drives, can be combined with each other. The advantages of the two drive types known in principle are used for a press without implementing the respective disadvantages. Mechanical deflections between the electro-hydrostatic drives and the movable elements driven by them can be omitted. The precision of controlling is increased, the design is simplified, and wear is reduced.

It is also possible for the die of the press to consist of a plurality of components, or respectively segments, for example divided along the direction of the main pressing axis, i.e., for the die to be a so-called parted die. In this case, the components or respectively segments of the die can be driven by the electro-hydrostatic drives provided according to the invention. In this case, the components or respectively segments of the die can form the movable elements per se provided according to the invention.

The at least one movable element can be at least one adjusting element for adjusting the die and/or at least one punch acting on the mould cavity of the die. The adjusting element can for example be provided to move, e.g. rotate, the die during pressing. The at least one movable element can be movable by means of the least one electro-hydrostatic drive along an axis running at an angle to the main press axis, preferably a transverse axis running transverse to the main press axis. Particularly when the additional movable element is an additional press punch, e.g. transverse bore holes, lateral recesses or undercuts in the pellet can be generated in this manner. The teaching according to the invention very effectively manifests the advantages of small installation space, simple controlling and high control precision, especially for axes running at an angle to the main press axis, e.g. transverse axes.

Alternatively, it is also possible for the at least one movable element to be an additional upper punch and/or an additional lower punch that can be moved by the at least one electro-hydrostatic drive parallel to the main press axis.

According to another embodiment, it can be provided that the movement of the at least one electro-hydrostatic drive to drive the at least one movable element, and the movement of the at least one electric drive to drive the upper punch and/or lower punch along the main press axis, are controlled by a common control apparatus. A uniform control is accordingly realized for the electric drives along the main press axis and the electro-hydrostatic drive(s) for the additional movable elements. In particular, a uniform control for all the drives of the press can be realized. Due to the use of electric drives for driving the upper and/or lower punch along the main press axis on the one hand, and the use of electro-hydrostatic drives for moving the at least one movable element, one electric motor can be activated for controlling in both cases.

The at least one electro-hydrostatic drive, in particular a hydraulic cylinder of the electro-hydrostatic drive, can act on the at least one movable element without mechanical deflection. It is in particular hence possible for no gearing to be provided between a hydraulic cylinder of the electro-hydrostatic drive and the movable element. As already mentioned, electro-hydrostatic drives, in particular their hydraulic cylinders, require less installation space while generating strong force. They can hence be easily integrated in the press, in particular arranged within a press frame. Complex mechanical deflections as provided in the prior art are unnecessary.

According to another embodiment, at least one hydraulic cylinder—acting on the at least one movable element—of the at least one electro-hydrostatic drive can be arranged spatially separate from at least one hydraulic pump actuating the at least one hydraulic cylinder, and from at least one electric motor driving the hydraulic pump, wherein the at least one hydraulic cylinder and the at least one hydraulic pump are connected to each other by means of a hydraulic feedline and a hydraulic drain line. The hydraulic feedline and hydraulic drain line can in particular be flexible. Such a separation of the actuator and force generator yields particularly flexible installation options for the electro-hydrostatic drive and hence smaller sizes of a press frame and hence a press. Since the hydraulic cylinder is separate from the hydraulic pump and the electric motor driving the hydraulic pump, the flexibility is enhanced with respect to the design and arrangement of the electro-hydrostatic drive. By means of flexible hydraulic lines, the two separate components of the electro-hydrostatic drive can be positioned substantially free from each other. Of course rigid hydraulic lines are also possible.

It can furthermore be provided that the press has a press frame within which are arranged a matrix plate having the matrix, the at least one upper punch and the at least one lower punch, wherein the at least one electric drive is arranged within the press frame or on the press frame, and wherein the at least one hydraulic cylinder of the electro-hydrostatic drive is arranged within the press frame, and the at least one hydraulic pump actuating the at least one hydraulic cylinder, as well as the at least one electric motor driving the hydraulic pump, are arranged outside of the press frame. Only the one hydraulic cylinder per se requiring a small installation space is therefore arranged within the press frame. The possibly larger drive components for the hydraulic cylinder are positioned outside of the press frame. The at least one hydraulic pump, as well as the at least one electric motor driving it, can for example be fastened to the outside of the press frame.

According to an additional embodiment, the hydraulic cylinder can be fastened to the die plate. Particularly with this embodiment, the fixed part of the hydraulic cylinder is fastened to the die plate, such as the cylinder housing. The cylinder piston is then movable relative to the fixed part, and hence relative to the die plate, to drive the at least one movable element. A secure and easy attachment of the hydraulic cylinder within the press frame is achieved, particularly when the hydraulic cylinder drives an adjusting element to adjust the die or an additional punch acting on the mould cavity of the die.

BRIEF DESCRIPTION OF THE DRAWINGS

An exemplary embodiment of the invention is explained below in greater detail with reference to figures. They show schematically.

DETAILED DESCRIPTION OF THE INVENTION

Figure 1:
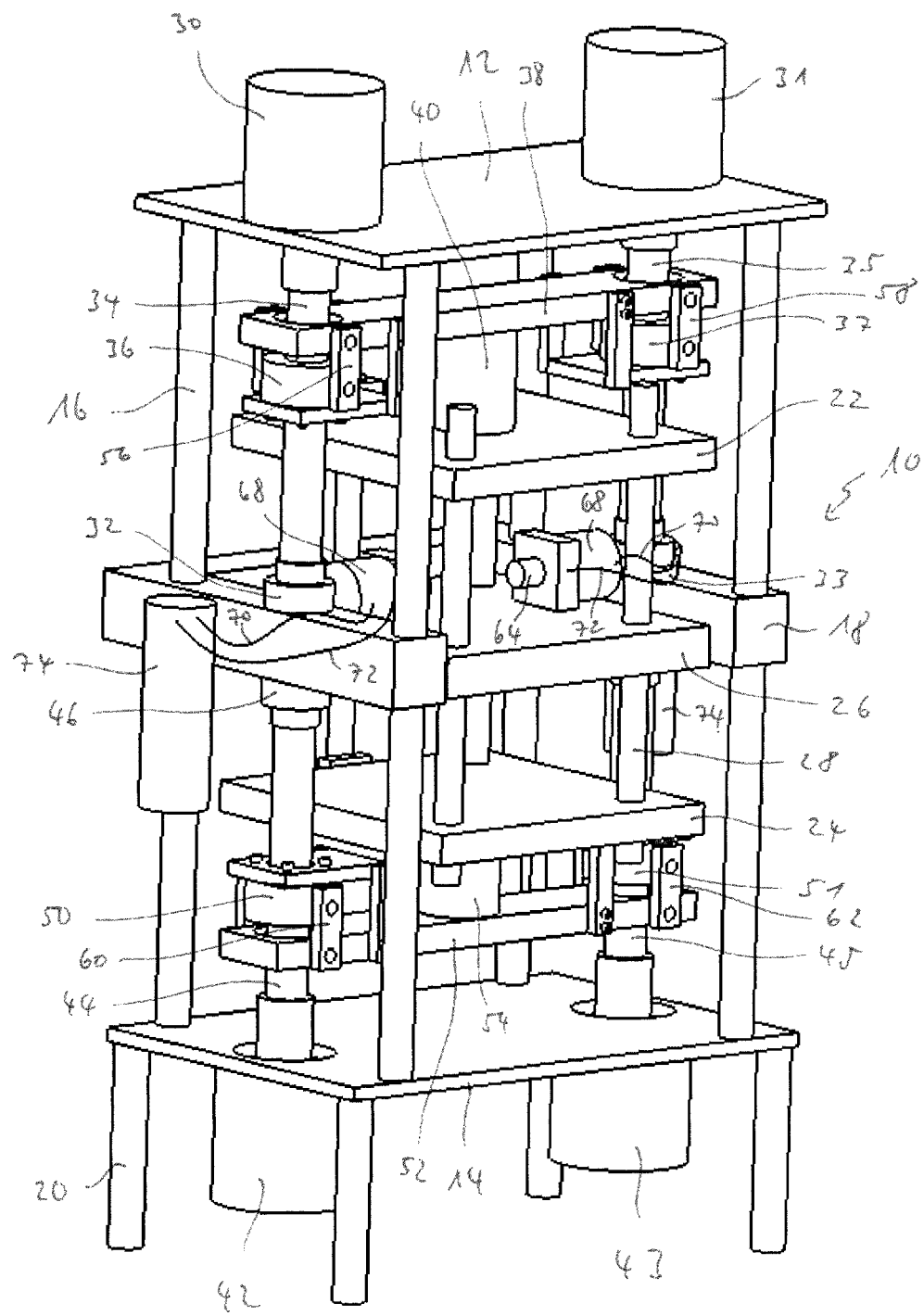
FIG. 1 A first perspective view of a press according to the invention.

While this invention may be embodied in many forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

If not otherwise specified, the same reference numbers indicate the same objects in the figures. The press according to the invention possesses a press frame 10 with an upper holding plate 12 and a lower holding plate 14. The upper and lower holding plates 12, 14 are connected to each other by means of four spacers 16 running in a vertical direction in the portrayed example, and to a bearing element 18 arranged approximately in the middle between the upper and lower holding plates 12, 14. In the portrayed example, the bearing element 18 is designed as a single part and possesses a U-profile lying in a horizontal plane, an arrangement and extension plane. The lower holding plate 14 stands on the supporting surface by means of four support legs 20. Furthermore, the press possesses an upper punch plate 22 with an upper punch (not shown) and a lower punch plate 24 with a lower punch (also not shown). In the portrayed example, a die plate 26 is arranged between the upper punch plate 22 and the lower punch plate 24 with a die (not shown) with a mould cavity for powder, such as metal or ceramic powder, to be pressed between the upper and lower punch. In the portrayed example, the upper punch plate 22, the lower punch plate 24, and the die plate 26 are connected to each other by means of vertical guide columns 28. In the portrayed example, the die plate 26 is directly attached to the bearing element 18.

The press according to the invention furthermore comprises two upper electric drives for vertically moving the upper punch plate 22, and two lower electric drives for vertically moving the lower punch plate 24. The upper and lower electric drives are each arranged on opposite sides of the press frame 10. The upper electric drives each comprise an upper electric drive motor 30, 31 arranged on the upper holding plate 12 and an upper spindle drive. The upper spindle drives comprise in each case an upper fixed bearing 32, 33 that is fastened in each case directly to the top side of the bearing element 18. The electric upper drive motors 30, 31 each rotatably drive an axially fixed upper spindle 34, 35. An axially movable upper spindle nut 36, 37 is arranged on each of the upper spindles 34, 35. When the upper spindles 34, 35 rotate, this therefore generates an axial movement of the respective upper spindle nuts 36, 37. The upper spindle nuts 36, 37 are fastened to opposite ends of an upper, bar-shaped force transmission bridge 38 which is connected in the middle to the upper punch plate 22 by means of another force transmission element 40. The upper electric drives with their upper electric drive motors 30, 31 therefore act laterally offset on the upper punch plate 22, and hence on the upper punch, by means of the force transmission bridge 38.

The design of the two bottom electric drives is accordingly identical to the design of the two upper electric drives. Hence the lower electric drives each have a lower electric drive motor 42, 43 that is arranged on the lower holding plate 14 and rotatably drives an axially fixed lower spindle 44, 45. A lower fixed bearing 46, 47 of each of the lower spindles 44, 45 is directly fastened to the bottom side of the bearing element 18. An axially movable lower spindle nut 50, 51 is in turn arranged on the lower spindles 44, 45. The lower spindle nuts 50, 51 are in turn arranged on opposite ends of a lower, bar-shaped force transmission bridge 52 which is connected in the middle to the lower punch plate 24 by means of another force transmission element 54. When the lower electric drive motors 42, 43 rotatably drive the lower spindles 44, 45, an axial movement of the lower spindle nuts 50, 51 arises which is transmitted to the lower punch plate 24 by means of the lower force transmission bridge 52 and the force transmission element 54 such that the punch plate is moved in a vertical direction. In turn, the lower electric drives with their lower electric drive motors 42, 43 therefore act laterally offset on the lower punch plate 24, and hence on the lower punch, by means of the lower force transmission bridge 52.

In the depicted example, the upper spindle nuts 36, 37 are connected to the upper force transmission bridge 38 by means of a total of four compensation elements, of which two can be seen in FIG. 1 under reference numbers 56, 58. Corresponding compensation elements with an equivalent function are arranged on the rear of the press, hidden in FIG. 1, opposite the compensation elements 56, 58 in each case. The lower spindle nuts 50, 51 are correspondingly connected by means of a total of four compensation elements to the lower force transmission bridge 52, of which two can be seen in FIG. 1 under reference numbers 60, 62. In turn on the rear of the press which cannot be seen in FIG. 1, there are two additional compensation elements opposite compensation elements 60, 62 which are identical to the compensation elements 60, 62 in terms of design and function.

The elongated compensation elements 56, 58, 60, 62 are rotatably mounted on the upper force transmission bridge 38, or respectively the lower force transmission bridge 52, by means of first pivot bearings. The compensation elements 56, 58, 60, 62 are each rotatably mounted on the upper, or respectively lower, spindle nuts by means of second pivot bearings. The pivot bearings of a compensation element in the resting position of the press shown in FIG. 1 are each arranged over each other in a vertical direction. The longitudinal axis of the elongated compensation elements 56, 58, 60, 62 also extends in a vertical direction in this resting state. During a pressing operation, enormous forces arise. These can cause the force transmission bridges 38, 52 to bend. This bending of the force transmission bridges 38, 52 leads to a tipping of the compensation elements 56, 58, 60, 62 which is enabled by a rotation of the compensation elements 56, 58, 60, 62 about their pivot bearings and hence, in conjunction with a gap between the spindle nuts 36, 37, 50, 51 and the associated force transmission bridges 38, 52, to compensation of a bending of the force transmission bridges 38, 52.

Figure 2:
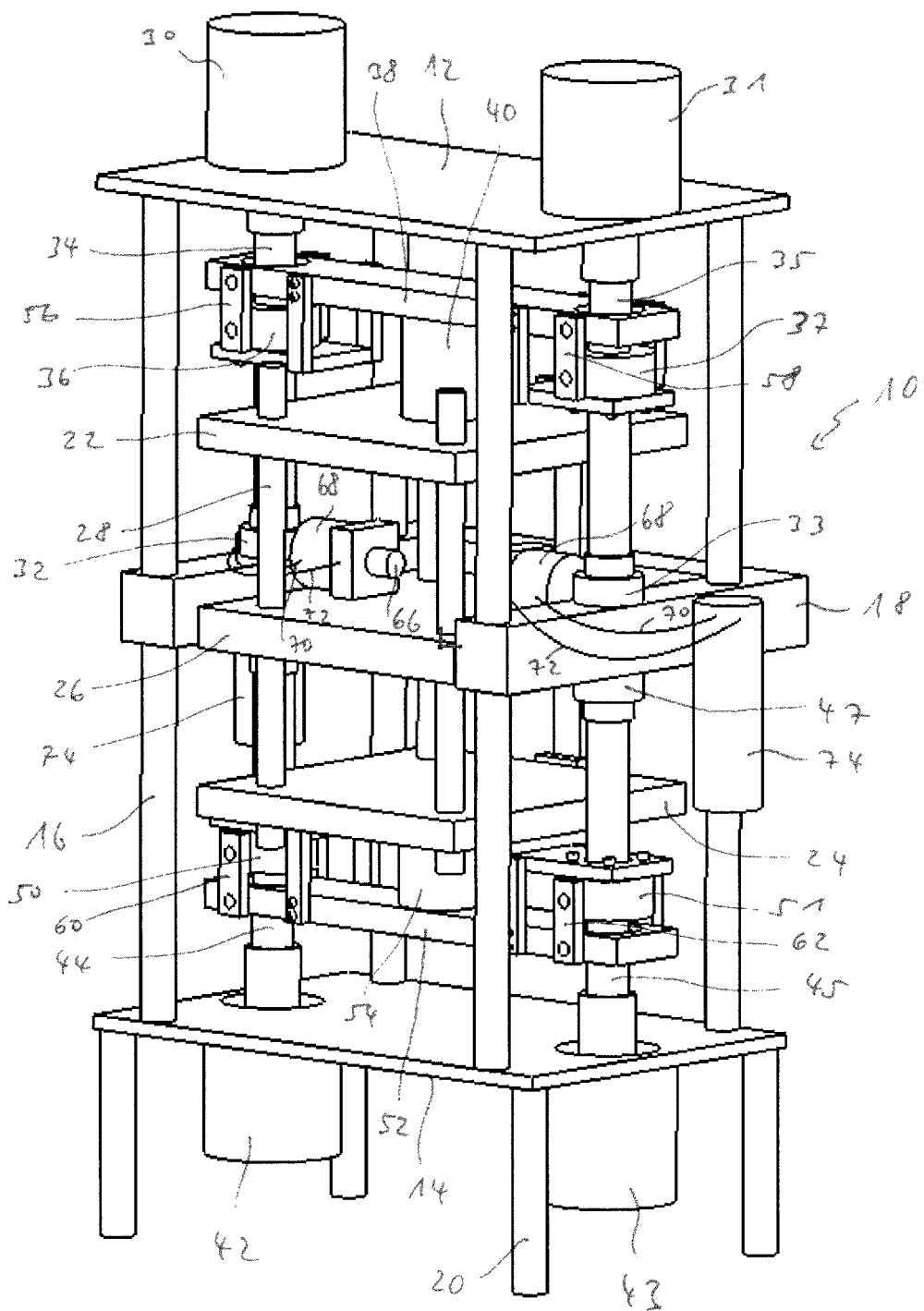
FIG. 2 A second perspective view of the press from FIG. 1.
Figure 3:
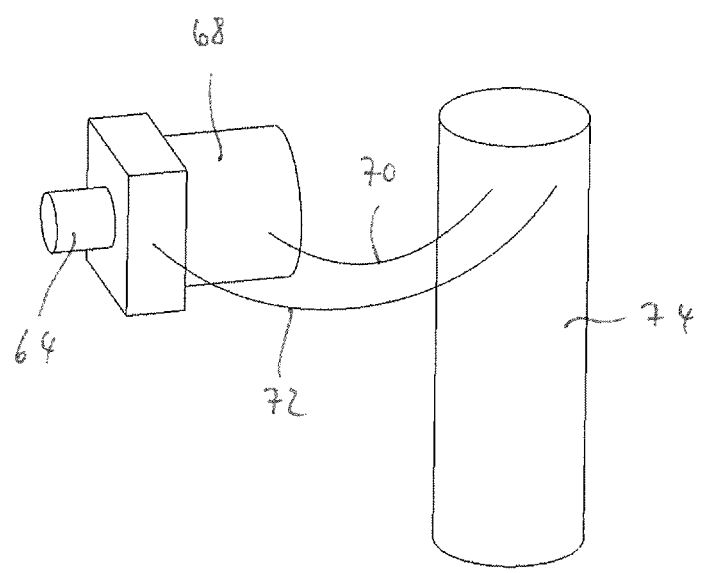
FIG. 3 A perspective view of an electro-hydrostatic drive used in the press from FIG. 1.

Furthermore in the exemplary embodiment shown in the figures, two additional movable elements are provided, i.e. the additional press punches, indicated by reference numbers 64, 66, which are movable along a transverse axis running perpendicular to the vertical main press axis of the upper punch and lower punch and also interact with the mould cavity of the die. In this manner, transverse openings, recesses or undercuts, for example, can be formed in the pellet imaged in the mould cavity. The additional press punches 64, 66 are each driven by means of an electro-hydrostatic drive. For the sake of illustration, FIG. 3 depicts an enlarged representation of the additional press punch 64 together with the electro-hydrostatic drive which drives it. Of course the other additional press punch 66 and its electro-hydrostatic drive are accordingly designed identically. The electro-hydrostatic drive comprises a hydraulic cylinder indicated by reference number 68. The hydraulic cylinder 68 is connected to a drive block 74 by means of the hydraulic lines 70, 72 which can be used as a hydraulic feedline or hydraulic drain line depending on the drive direction of the hydraulic cylinder. The drive block 74 comprises a hydraulic pump which is connected to a reservoir for hydraulic fluid. In addition, the drive block 74 comprises an electric motor which drives the hydraulic pump. By means of the hydraulic pump, the hydraulic fluid is pumped out of the reservoir, for example by means of the hydraulic line 70 used in this case as a feedline, to actuate the hydraulic cylinder 68, wherein the hydraulic fluid can flow from the hydraulic cylinder 68 back to the hydraulic pump and into the hydraulic reservoir by means of the hydraulic line 72 used in this case as a drain line. It can be seen that the electro-hydrostatic drives, in particular the hydraulic cylinders 68 of the electro-hydrostatic drives, act on the additional press punches 64, 66 to move them without gearing, particularly without mechanical deflection. Furthermore, it can be seen in FIGS. 1 and 2 that the hydraulic cylinders 68 are arranged within the press frame 10, whereas the drive blocks 74 are attached to the exterior of the press frame outside of the press frame. The necessary connection for actuating the hydraulic cylinders 68 exists by means of the flexible hydraulic lines 70, 72. Of course, a path measuring system for the hydraulic cylinder 68 is also provided. This can be integrated within the hydraulic cylinder or arranged externally. Only a small installation space is required within the press frame 10 with a high application of force. The hydraulic cylinders 68 can be attached via their fixed part to the die plate 26. Furthermore, the portrayed exemplary embodiment provides a common control apparatus (not shown) which is designed to control both the upper and lower electric drive units to drive the upper and lower punches along the main press axis, as well as to control the electric motors which are provided in the drive blocks 74 of the electro-hydrostatic drives. A uniform approach in terms of control engineering and safety engineering is accordingly realized.

The above examples and disclosure are intended to be illustrative and not exhaustive. These examples and description will suggest many variations and alternatives to one of ordinary skill in this art. All of these alternatives and variations are intended to be included within the scope of the claims, where the term "comprising" means "including, but not limited to". Those familiar with the art may recognize other equivalents to the specific embodiments described herein which equivalents are also intended to be encompassed by the claims. Further, the particular features presented in the dependent claims can be combined with each other in other manners within the scope of the invention such that the invention should be recognized as also specifically directed to other embodiments having any other possible combination of the features of the dependent claims. For instance, for purposes of written description, any dependent claim which follows should be taken as alternatively written in a multiple dependent form from all claims which possess all antecedents referenced in such dependent claim.

What is claimed is:

1. A press for producing pellets from powdered material comprising at least one die with a mould cavity imaging the pellet, at least one upper punch and at least one lower punch that interact with the mould cavity to form the pellet, and at least one electric drive for driving the upper punch, and/or the lower punch, and/or the die along a main press axis, characterized in that the press also comprises at least one movable element acting on the die and/or the mould cavity of the die, wherein at least one electro-hydrostatic drive is provided to drive the at least one movable element;

further characterized in that the movement of the at least one electro-hydrostatic drive to drive the at least one movable element, and the movement of the at least one electric drive to drive the upper punch and/or lower punch along the main press axis, is controlled by a common control apparatus further characterized in that the at least one hydraulic cylinder (68)—acting on the at least one movable element—of the at least one electro-hydrostatic drive is arranged spatially separate from at least one hydraulic pump actuating on the at least one hydraulic cylinder (68), and from at least one electric motor driving the hydraulic pump, wherein the at least one hydraulic cylinder (68) and the at least one hydraulic pump are connected to each other by means of a hydraulic feedline (70, 72) and a hydraulic drain line (70, 72), and further characterized in that the press has a press frame (10) within which are arranged a die plate (26) having the die, the at least one upper punch and the at least one lower punch, wherein the at least one electric drive is arranged within the press frame (10) or on the press frame (10), and wherein the at least one hydraulic cylinder (68) of the electro-hydrostatic drive is arranged within the press frame (10), and the at least one hydraulic pump actuating the at least one hydraulic cylinder (68), as well as the at least one electric motor driving the hydraulic pump, are arranged outside of the press frame (10).

2. The press according to claim 1, characterized in that the at least one movable element is at least one adjusting element for adjusting the die and/or at least one other punch (64, 66) acting on the mould cavity of the die.

3. The press according to one of claim 1, characterized in that the at least one movable element is movable by means of the at least one electro-hydrostatic drive along an axis running at an angle to the main press axis, preferably a transverse axis running transverse to the main press axis.

4. The press according to one of claim 1, characterized in that the at least one movable element is an additional upper punch and/or an additional lower punch that can be moved by the at least one electro-hydrostatic drive parallel to the main press axis.

5. The press according to claim 1, characterized in that the at least one electro-hydrostatic drive acts on the at least one movable element without mechanical deflection.

6. The press according to claim 1, characterized in that the hydraulic feedline (70, 72) and the hydraulic drain line (70, 72) are flexible.

7. The press according to claim 1, characterized in that the hydraulic cylinder (68) is attached to the die plate (26).

* * * * *